US009976915B2

(12) United States Patent
DeSilva (10) Patent No.: US 9,976,915 B2
(45) Date of Patent: May 22, 2018

(54) TEMPERATURE MEASUREMENT IN A GAS TURBINE ENGINE COMBUSTOR

(71) Applicant: Upul DeSilva, Oviedo, FL (US)

(72) Inventor: Upul DeSilva, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 734 days.

(21) Appl. No.: 13/804,132

(22) Filed: Mar. 14, 2013

(65) Prior Publication Data
US 2014/0278200 A1    Sep. 18, 2014

(51) Int. Cl.
  G01K 13/02      (2006.01)
  G01K 11/26      (2006.01)
  G01K 15/00      (2006.01)

(52) U.S. Cl.
  CPC .............. G01K 13/02 (2013.01); G01K 11/26 (2013.01); G01K 15/005 (2013.01); G01K 2013/024 (2013.01); G01K 2213/00 (2013.01)

(58) Field of Classification Search
  CPC .. G01K 11/24; G01K 13/02; G01K 2013/024; G01K 11/26; G01K 11/22; G01M 15/14; F01D 21/12; G01F 1/66; G01F 1/668; F23N 2023/00; F23N 2025/08; F23N 2041/20; F23N 5/16
  See application file for complete search history.

(56) References Cited

U.S. PATENT DOCUMENTS

| 2,582,232 | A | 1/1952 | Cesaro et al. |
| 5,168,699 | A | 12/1992 | McCarty et al. |
| 6,386,755 | B1 * | 5/2002 | Draxton ................. G01K 11/24 374/117 |
| 6,952,639 | B2 | 10/2005 | Kumar et al. |
| 7,598,485 | B2 | 10/2009 | Csutak |
| 7,761,216 | B2 | 7/2010 | Norris et al. |
| 8,146,408 | B2 | 4/2012 | Snow |

(Continued)

FOREIGN PATENT DOCUMENTS

| EP | 1602904 A1 | 12/2005 |
| WO | 9958942 A1 | 11/1999 |

OTHER PUBLICATIONS

Harmonic, Wikipedia, the free encyclopedia, Feb. 12, 2011.*

(Continued)

*Primary Examiner* — Kyle R Quigley (57) ABSTRACT

A method and system for determining a temperature of a working gas passing through a passage to a turbine section of a gas turbine engine. The method includes identifying an acoustic frequency at a first location in the engine upstream from the turbine section, and using the acoustic frequency for determining a first temperature value at the first location that is directly proportional to the acoustic frequency and a calculated constant value. A second temperature of the working gas is determined at a second location in the engine and, using the second temperature, a back calculation is performed to determine a temperature value for the working gas at the first location. The first temperature value is compared to the back calculated temperature value to change the calculated constant value to a recalculated constant value. Subsequent first temperature values at the first location may be determined based on the recalculated constant value.

16 Claims, 6 Drawing Sheets

(56) References Cited

U.S. PATENT DOCUMENTS

| | | | |
|---|---|---|---|
| 2005/0276306 A1* | 12/2005 | Mick | G01K 11/26 |
| | | | 374/117 |
| 2006/0142932 A1* | 6/2006 | Yasui | F01L 1/352 |
| | | | 701/114 |
| 2006/0248893 A1* | 11/2006 | Mick | F01D 21/003 |
| | | | 60/772 |
| 2007/0062196 A1* | 3/2007 | Gleeson | F23N 5/242 |
| | | | 60/722 |
| 2009/0183573 A1 | 7/2009 | Fricke et al. | |
| 2009/0241506 A1 | 10/2009 | Nilsson | |
| 2010/0132375 A1 | 6/2010 | Tanimura et al. | |
| 2011/0154821 A1 | 6/2011 | Evans-Beauchamp | |

OTHER PUBLICATIONS

Gustave C. Fralick; Acoustic Pyrometry Applied to Gas Turbines and Jet Engines; 2 pages.

John A. Kleppe et al.; The Measurement of Performance of Combustors Using Passive Acoustic Methods; 42nd AIAA Aerospace Sciences Meeting and Exhibit; AIAA 2004-1046; Jan. 5-8, 2004; pp. 1-8.

\* cited by examiner

TEMPERATURE MEASUREMENT IN A GAS TURBINE ENGINE COMBUSTOR

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The present invention relates to temperature measurement in turbine engines and, more particularly, to determination of temperature of hot working gases entering a turbine section of an engine based on detection of a frequency signal produced within the working gases.

BACKGROUND OF THE INVENTION

Combustion turbines, such as gas turbine engines, generally comprise a compressor section, a combustor section, a turbine section and an exhaust section. In operation, the compressor section inducts and compresses ambient air. The combustor section generally may include a plurality of combustors for receiving the compressed air and mixing it with fuel to form a fuel/air mixture. The fuel/air mixture is combusted by each of the combustors to form a hot working gas that may be routed to the turbine section where it is expanded through alternating rows of stationary airfoils and rotating airfoils and used to generate power that can drive a rotor. The expanding gas exiting the turbine section can be exhausted from the engine via the exhaust section.

The fuel/air mixture at the individual combustors is controlled during operation of the engine to maintain one or more operating characteristics within a predetermined range, such as, for example, to maintain a desired efficiency and/or power output, control pollutant levels, prevent pressure oscillations and prevent flameouts. In a known type of control arrangement, a bulk turbine exhaust temperature may also be monitored as a parameter that may be used to monitor the operating condition of the engine. For example, a controller may monitor a measured turbine exhaust temperature, and a measured change in temperature at the exhaust may result in the controller changing an operating condition of the engine.

SUMMARY OF THE INVENTION

In accordance with an aspect of the invention, a method is provided for determining a temperature of a working gas passing through a passage to a turbine section of a gas turbine engine. The method comprises identifying one or more acoustic frequencies at a first location in the engine upstream from the turbine section, the one or more acoustic frequencies being generated within the working gas; determining, for each of the one or more acoustic frequencies, a first temperature value of the working gas at the first location based on a function, T, that is directly proportional to each of the one or more acoustic frequencies and a calculated constant value corresponding to each of the one or more acoustic frequencies; determining a second temperature of the working gas at a second location in the engine; based on the second temperature, determining a calculated temperature value for the working gas at the first location; comparing the first temperature value determined for each of the one or more frequencies to the calculated temperature value and, for each of the one or more frequencies, changing the calculated constant values to recalculated constant values based on the comparison; and determining subsequent first temperature values at the first location based on further identified acoustic frequencies and the recalculated constant values.

The step of determining the one or more identified acoustic frequencies may include determining one or more dominant frequencies at the first location.

The one or more acoustic frequencies may be generated by combustion of a fuel/air mixture at the first location.

The function, T, that is directly proportional to the acoustic frequency and the calculated constant value may be described by the equation:

$$T = f^2 \times k$$

where:
f is the identified acoustic frequency; and
k is the calculated constant value.

The calculated constant value, k, may be described by the equation:

$$k = 16L^2/\gamma R$$

where:
L is an effective length corresponding to dimensional characteristics of the passage;
$\gamma$ is a ratio of specific heats; and
R is the gas constant;
wherein the recalculated constant value for each of the one or more acoustic frequencies corresponds to a value for the effective length, L, that is adjusted such that the first temperature value determined for the first location is equal to the calculated temperature value.

A plurality of temperature values may be determined at the first location, and the method may include determining a two-dimensional temperature map at the first location based on the plurality of temperature values. The method may further include determining a bulk temperature at the first location based on a mean temperature obtained from the two-dimensional temperature map.

The first location may be at a combustor for the engine and the second location may be selected to obtain a turbine exhaust temperature. Further, the first location may be selected to obtain a turbine inlet temperature.

The method may further include identifying at least two acoustic frequencies at the first location in the engine, each acoustic frequency being associated with a different frequency mode, n, and, for each frequency mode, the first temperature value determined by the function, T, is described by the equation:

$$T = f_n^2 \times k_n$$

where:
$f_n$ is the identified acoustic frequency for the $n^{th}$ frequency mode;
$k_n$ is the calculated constant value for the $n^{th}$ frequency mode; and
wherein the value of T is the same for each mode, n.

The acoustic frequencies may be sensed at two or more positions around a periphery of the passage to the turbine section, and the method may further include: determining two or more temperature values at each of two or more different locations located generally within a planar region defined as extending radially within the passage; wherein each temperature is determined by sensing two or more frequencies corresponding to each frequency mode at each of the two or more positions; and for each location in the planar region, determining a constant corresponding to each of the frequency modes.

In accordance with another aspect of the invention, a system is provided for determining a temperature of a working gas passing through a duct defining passage to a turbine section of a gas turbine engine. The system comprises at least one acoustic sensor on the duct located at a first axial location in the engine upstream from the turbine section. The at least one sensor senses acoustic frequencies, and produces frequency signals corresponding to one or more acoustic frequencies generated within the working gas. A processor is provided for determining, for each of the one or more acoustic frequencies, a first temperature value of the working gas at the first location based on a function, T, that is directly proportional to each of the one or more acoustic frequencies and a calculated constant value corresponding to each of the one or more acoustic frequencies. A temperature sensor is located at a second location in the engine, the temperature sensor providing a temperature signal to the processor corresponding to a second temperature of the working gas at the second location in the engine. The processor operates to: determine a calculated temperature value for the working gas at the first location based on the second temperature; compare the first temperature value determined for each of the one or more frequencies to the calculated temperature value and, for each of the one or more frequencies, change the calculated constant values to recalculated constant values based on the comparison; and determine subsequent first temperature values at the first location based on the recalculated constant values and further identified acoustic frequencies sensed by the acoustic sensor.

The first location may be at a duct associated with a combustor for the engine and the second location may be located downstream from the turbine section to obtain a turbine exhaust temperature.

A plurality of the acoustic sensors may be spaced around a periphery of the duct, and each of the acoustic sensors may provide frequency signals to the processor.

The processor may determine a two-dimensional temperature map at the first location based on the processor determining temperature values at each of two or more different locations located generally within a planar region defined as extending radially within the passage.

The processor may determine the value for the function, T, using the equation:

$$T = f^2 \times k$$

where:
f is the identified acoustic frequency; and
k is the calculated constant value.

The processor may further determine the calculated constant value, k, using the equation:

$$k = 16L^2/\gamma R$$

where:
L is an effective length corresponding to dimensional characteristics of the passage;
$\gamma$ is a ratio of specific heats; and
R is the gas constant;
wherein the recalculated constant value for each of the one or more acoustic frequencies corresponds to a value for the effective length, L, that is adjusted such that the first temperature value determined for the first location is equal to the calculated temperature value.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

According to various aspects of the present invention, systems and methods are provided for determining a hot working gas temperature within a gas turbine engine using one or more detected acoustic frequencies from a passage for the working gas. For example, as will be described in greater detail herein, an acoustic frequency resulting from a combustion event, comprising combustion of a fuel/air mixture at a location within a passage to a turbine section of a gas turbine engine, is detected for determining the temperature within the passage using a relationship correlating dominant frequency to temperature. The relationship for correlating dominant frequency to temperature is modified based on a temperature measurement made downstream from the turbine section, wherein a back calculation is performed to extract a calculated turbine inlet temperature for use in comparison to the frequency derived temperature. The relationship correlating dominant frequency to temperature is based in part on a dimensional passage parameter and identification of a frequency mode, and the back calculated turbine inlet temperature is used to transform the correlation between frequency and temperature to eliminate inaccuracies that otherwise may result from lack of information regarding the dimensional passage parameter and frequency mode.

An exemplary approach to determine the temperature of the working gas passing through the passage to the turbine section comprises measuring an acoustic frequency generated within the working gas, and determining a first temperature based the product of the square of the frequency and a constant that incorporates the dimensional passage parameter and the frequency mode. A second temperature is determined downstream from the location of the first temperature and is used to back calculate a temperature value at the location of the first temperature. Based on a comparison of the first temperature determined from the frequency measurement and the back calculated temperature value, the value of the constant is adjusted and is used for subsequent frequency based temperature determinations.

As such, a correlation between frequency and temperature is implemented in which reliance on knowledge of the dimensional characteristics associated with the passage, as well as knowledge of the particular frequency mode, is not needed to provide an increase in the accuracy of the frequency based temperature determination. Further frequency based temperature determinations are made using the adjusted constant value as an accurate scaling factor, where variations in the measured frequency result in corresponding variations in the determined temperature.

Figure 1:
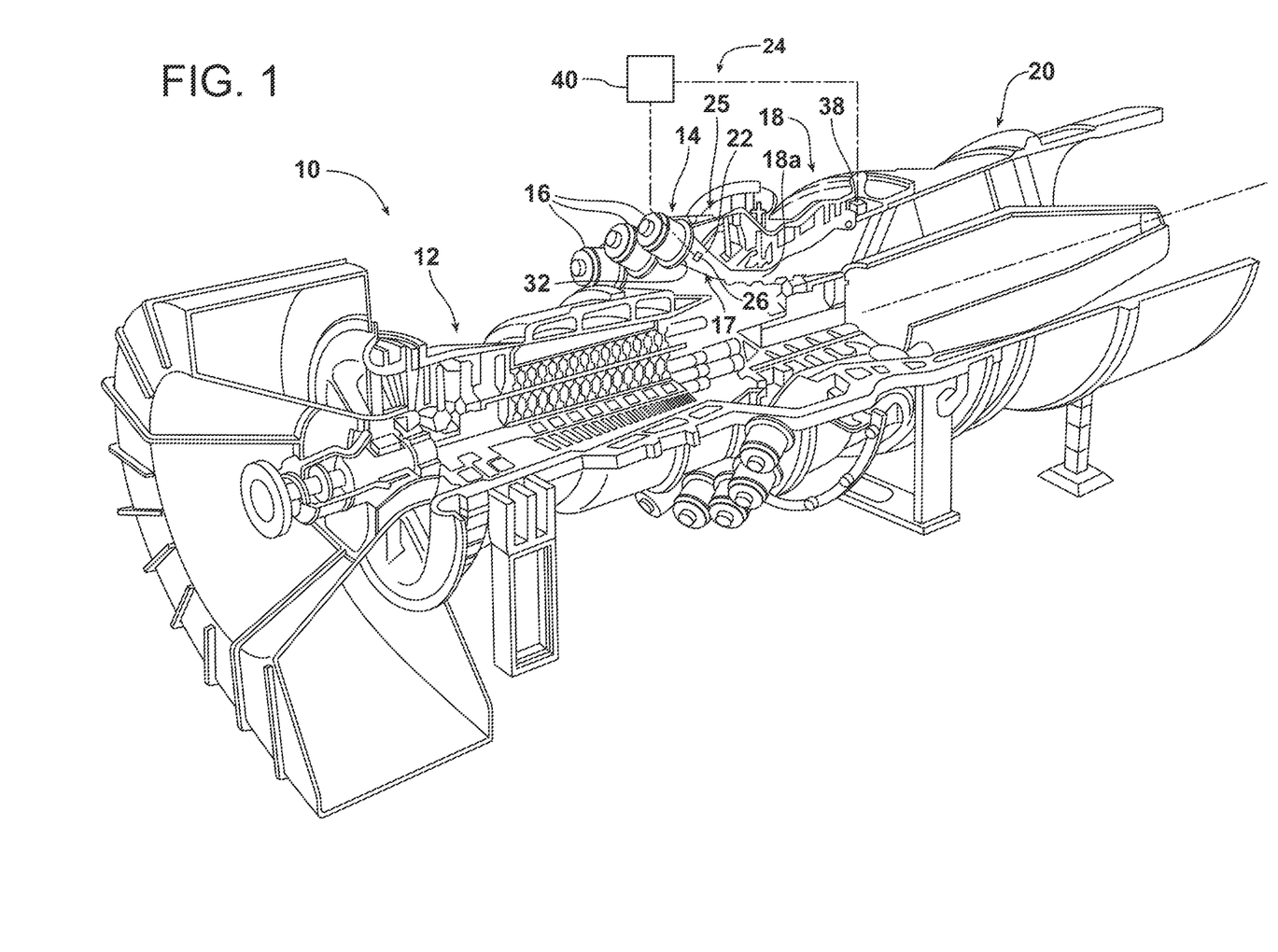
FIG. 1 is a perspective cross-sectional view of a gas turbine engine illustrating implementation of a system for determining temperature in accordance with aspects of the present invention.

Referring to the drawings, and in particular to FIG. 1, a portion of an exemplary gas turbine engine 10 is shown. The exemplary engine 10 includes a compressor section 12, a combustor section 14, a turbine section 18, and an exhaust section 20. The combustor section 14 includes a plurality of combustor baskets or combustors 16 and associated transition ducts 22, wherein the combustors 16 and transition ducts 22 define a passage 17 for conveying hot working gas to the turbine section 18.

During operation of the engine 10, compressed air from the compressor section 12 is provided to the combustor section 14 where it is combined with fuel in the combustors 16, and the fuel/air mixture is ignited to form combustion products comprising the hot working gas. It may be understood that combustion of the fuel and air may occur at various axial locations along the passage to the inlet 18a of the turbine section 18. The hot working gas is expanded through the turbine section 18 and is exhausted through the exhaust section 20.

Figure 2:
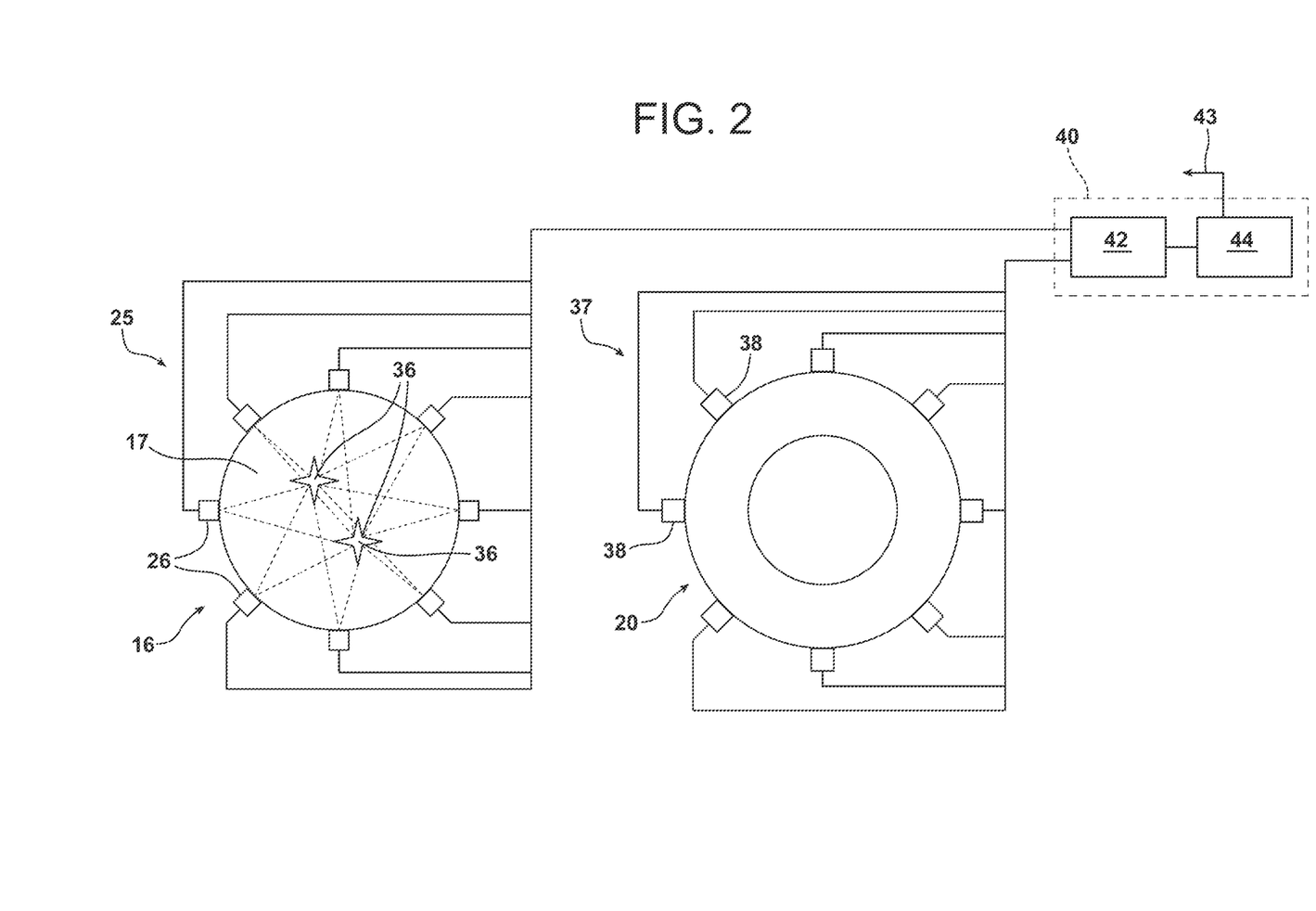
FIG. 2 is a diagrammatic view of the system for determining temperature.

Referring to FIGS. 1 and 2, in accordance with an aspect of the invention, a system 24 is provided for determining a temperature of the working gas passing through the passage 17 upstream from the turbine section inlet 18a, i.e., for determining a turbine inlet temperature. The system 24 includes a turbine inlet sensor unit 25 (FIG. 2) comprising at least one acoustic sensor 26 located at a first axial location along the passage 17. As seen in FIG. 2, the turbine inlet sensor unit 25 preferably includes a plurality of acoustic sensors 26 distributed around the circumference of a wall defining the passage 17, where the wall may comprise, for example, either a shell or liner wall of the combustor 16 or a wall of the transition duct 22. Further, it should be understood that a plurality of individual passages 17 may be provided associated with each of the combustors 16, including a combustor shell 32 and a respective transition duct 22, and each of the passages 17 may be provided with respective acoustic sensors 26, as will be discussed further below.

Figure 3:
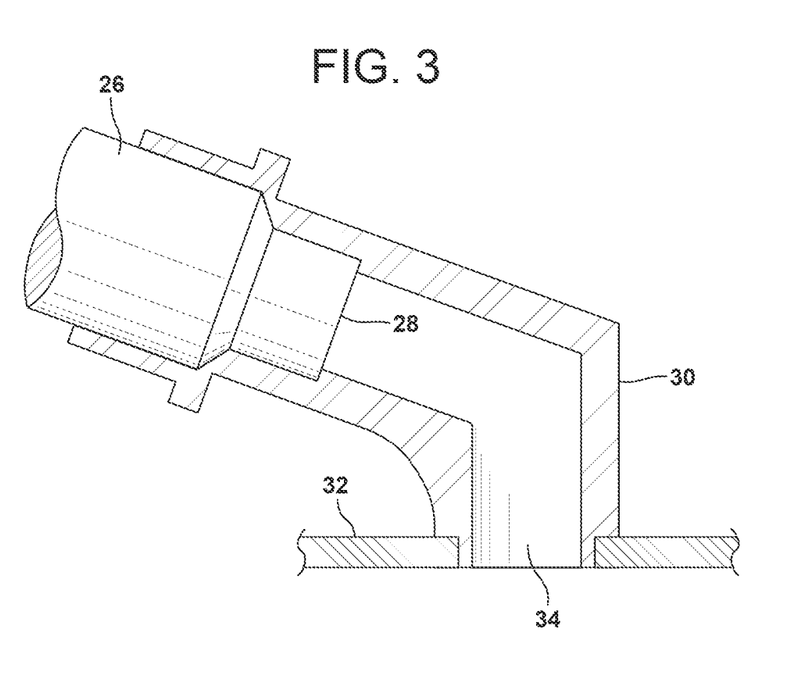
FIG. 3 is a cross-sectional view illustrating an acoustic sensor mounted on a combustor shell.

Referring to FIG. 3, each acoustic sensor 26 includes a sensing surface 28 that is in fluid communication with the hot working gases flowing through the passage 17. In particular, a mounting housing 30 may be attached to the passage wall, illustrated in FIG. 3 as the combustor shell 32, and includes an opening 34 in communication with the flame and hot working gases in the passage 17 for sensing acoustic frequencies generated in the working gases. In accordance with an aspect of the invention, the acoustic frequencies sensed by the acoustic sensor 26 are generated as a result of combustion events, defining acoustic sources, that occur within the area of the passage 17, as depicted by two acoustic events 36. The dotted lines in FIG. 2 illustrate passage of an acoustic frequency from each acoustic event 36 to each of the sensors 26.

It may be noted that the hot working gases within the passage 17 are at a very high temperature, which has prevented or limited direct access to frequency measurement, i.e., a direct flow passage access to the working gases, at the location of the combustor shell 30, transition 22 and/or other inlet passage locations supplying the working gas to the turbine section 18. In accordance with an aspect of the invention, an acoustic sensor 26 is provided having a sapphire sensor head defining the sensing surface 28 that is capable of operating continuously while exposed to hot working gases. For, example, a sensor 26 that may be implemented in the present invention may comprise a sensor sold under the name Wave-Phire™ available from Oxsensis, Ltd.

Referring to FIG. 2, the system 24 additionally includes a turbine exhaust sensor unit 37 including one or more exhaust temperature sensors 38 (see also FIG. 1) positioned at a second axial location in the engine 10 downstream from the last row of blades in the turbine section 18. The exhaust temperature sensors 38 may comprise any type of sensor for providing a temperature signal output, such as for example thermocouple sensors, distributed around the circumference of an upstream portion of the exhaust section 20.

The acoustic sensors 26 and exhaust temperature sensors 38 are connected to a control unit or controller 40 that includes a data acquisition and processing unit 42 configured to store and process data corresponding to the received frequency signals. The data acquisition and processing unit 42 further produces outputs in accordance with calculated or determined temperatures corresponding to the received signals, as will be described further below. The controller 40 additionally comprises a combustion control unit 44 receiving signals from the data acquisition and processing unit 42 to output control signals 43 for controlling operations affecting combustion, including signals to the individual combustors 16, providing control of, for example, the fuel/air ratio at the combustors 16.

In accordance with an aspect of the invention, a method of using the system 24 to determine a turbine inlet temperature is described, where at least one of the acoustic sensors 26 senses one or more frequencies to provide corresponding frequency signals to the controller 40. In the controller 40, the data acquisition and processing unit 42 determines a temperature on the basis of a relationship between frequency and temperature, where it may be understood that dominant frequencies are coupled with gas temperature through the speed of sound. In particular, assuming that the passage 17 formed by the combustor 16 and/or the associated transition 22 may be characterized as a closed-open hollow cylinder, and that the dominant frequencies in the passage 17 are axial resonant frequencies, the dominant frequencies will vary in proportion to the bulk temperature within the passage 17 in accordance with the equation:

$$f_n = [(2n-1)c]/4L \qquad (1)$$

where:
n=nth harmonic, where n is a positive integer
L=effective length of the passage, in meters
$c=(\gamma RT)^{1/2}$
γ=ratio of specific heats
R=gas constant, 8.314 J/mole-K
T=temperature, K The above equation may be rewritten to express the temperature, T, in accordance with the equation:

$$T = (f_n \cdot 4L)^2 / [(2n-1)^2 \cdot \gamma \cdot R] \quad (2)$$

which may be simplified as follows:

$$T = f_n^2 \cdot [16L^2 / [(2n-1)^2 \cdot \gamma \cdot R]] \quad (3)$$

Figure 4:
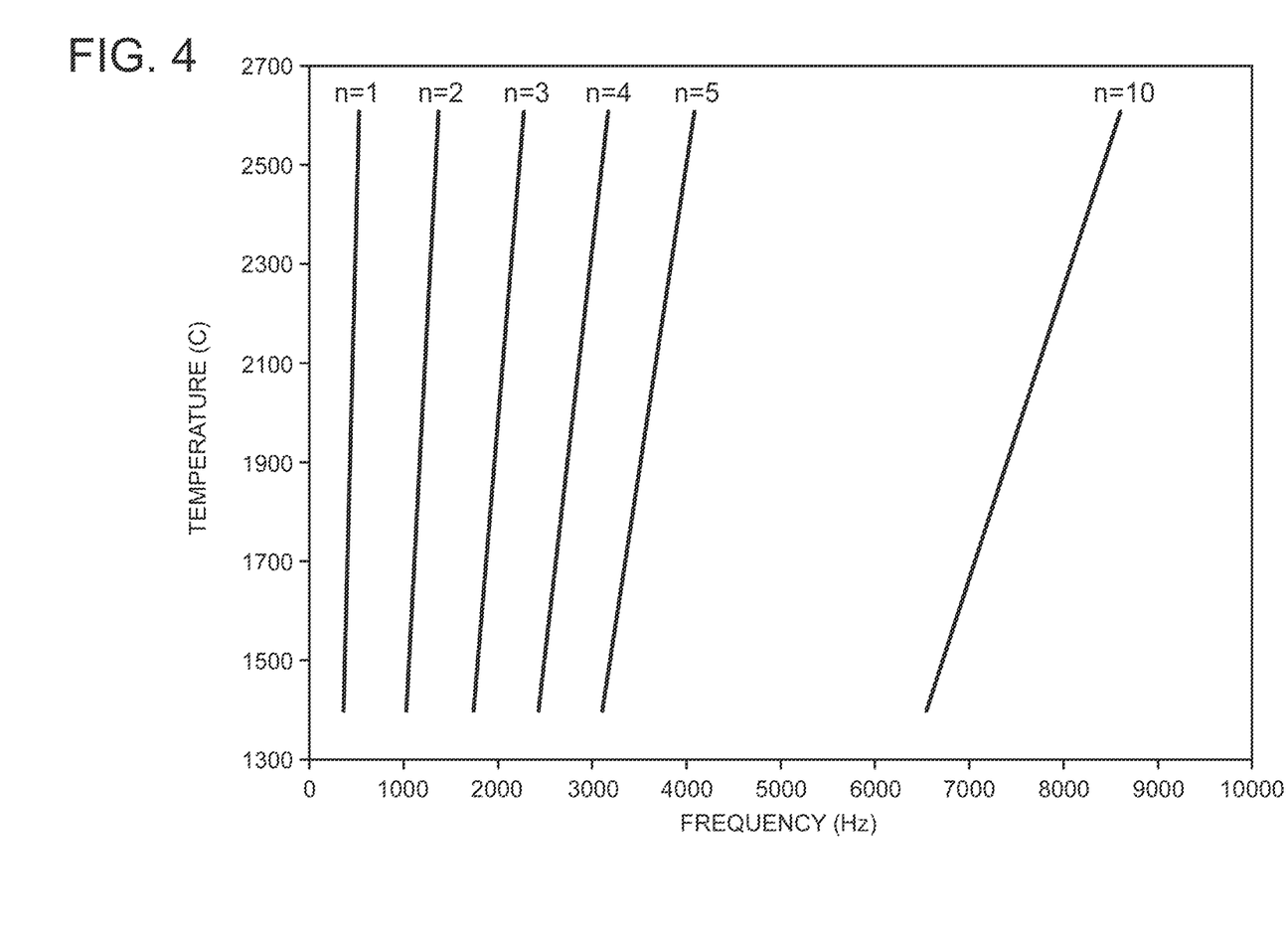
FIG. 4 is a plot illustrating a determination of temperature as a function of frequency for different harmonic modes.

For the fixed geometry of the passage 17, it may be assumed that the effective length, L, is a constant value. Further, in accordance with an aspect of the invention, it is noted that knowledge of the specific harmonic mode to determine a temperature is not necessarily required. That is, for each harmonic mode, the temperatures of the gases flowing within the passage 17 will typically fall within a particular band of frequencies associated with a temperature range, as is illustrated in FIG. 4. Hence, the harmonic mode, n, in the above equation for temperature, T, may be treated as a constant for a particular set of frequencies corresponding to gas temperatures in the passage 17, and the equation for temperature may be expressed as directly proportional to the square of the acoustic frequency and a constant value, k, as follows:

$$T = f_n^2 \cdot k \quad (4)$$

where:

$$k = 16L^2 / [(2n-1)^2 \cdot \gamma \cdot R] \quad (5)$$

An initial value for k may be estimated based on an assumed mode for a sensed acoustic frequency, e.g., the first mode, and an estimated effective length, L. For example, the effective length may be estimated using the known relationship of $L = L_0 + 0.85D$, where $L_0$ is the length (in meters) of the passage 17, and D is the diameter (in meters) of the passage 17. However, recognizing that there may be inaccuracies inherent in the determination of the effective length, L, the method described for the present invention provides an adjustment process for determining a value for the constant, k, to obtain increased precision in determining the temperature.

Figure 5:
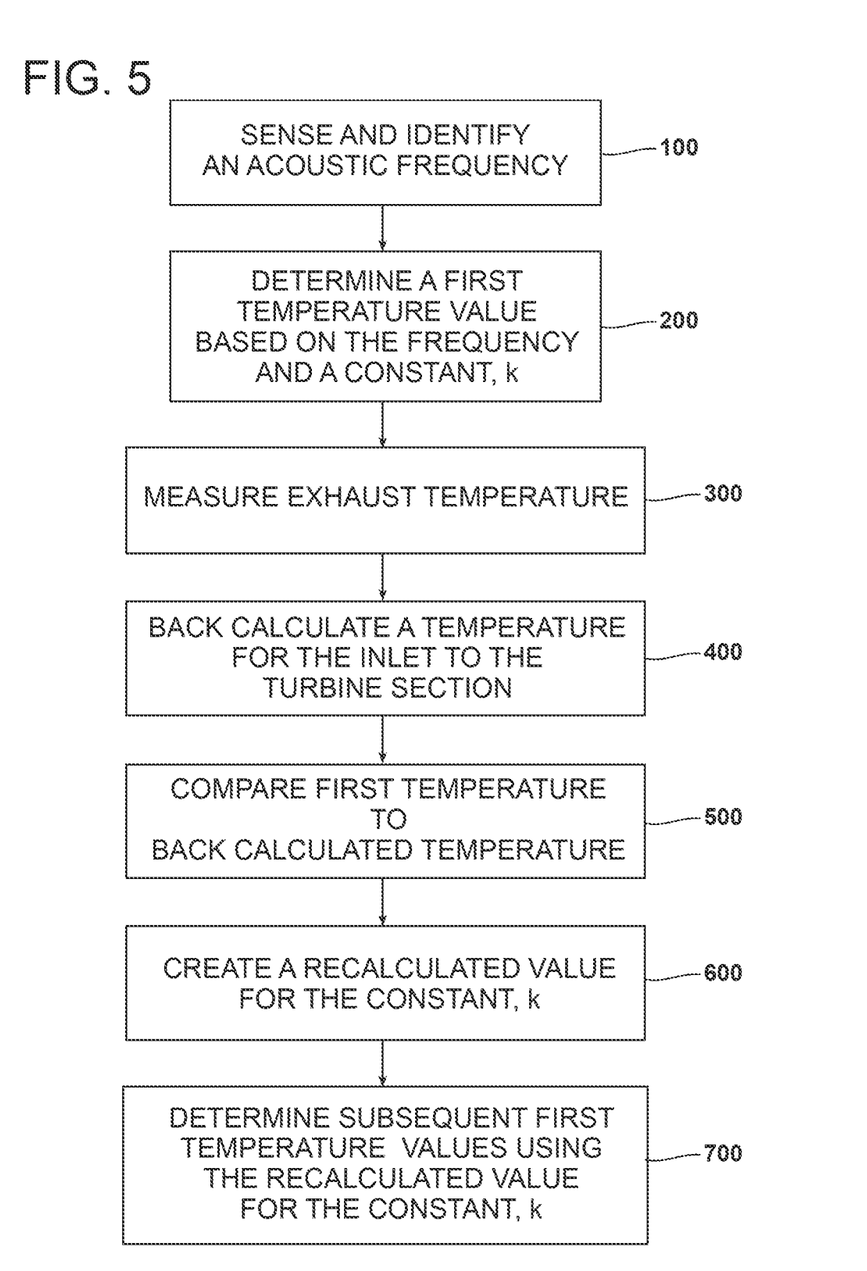
FIG. 5 illustrates steps for performing a method in accordance with aspects of the invention.

Specifically, referring to FIG. 5, a method of determining the temperature in the passage 17 comprises the sensors 26 sensing one or more acoustic frequencies at the first location in the engine 10 upstream from the turbine section 18, and providing one or more acoustic signals corresponding to the sensed frequencies to the controller 40 for identifying the acoustic frequencies (100). The acoustic frequencies are generated by combustion events 36 (FIG. 2) resulting from ignition of fuel and air forming and located within the working gas in the passage 17. For each sensed and identified acoustic frequency, a first temperature value of the working gas is determined based on the equation (4) above where the temperature, T, is a function that is directly proportional to each of the one or more acoustic frequencies and a calculated constant value corresponding to each of the one or more acoustic frequencies (200).

Referring further to FIG. 5, in order to calibrate or recalculate the constant, k, a second temperature of the working gas is obtained based on temperature signals provided by the exhaust temperature sensors 38 at the turbine exhaust sensor unit 37 (300). The controller 40 uses the exhaust temperature to back calculate a temperature for the inlet to the turbine section 18 (400). The controller 40 compares the first temperature value determined for each of the one or more frequencies to the back calculated temperature value determined based on the exhaust temperature (500). Based on the comparison, the value of the calculated constant, k, is adjusted to create a recalculated constant value (600), such that the temperature value determined by equation (4) corresponds to the back calculated temperature value. Subsequent temperatures are then determined by sensed frequencies at the turbine inlet sensor unit 25, using the recalculated constant value and the subsequently sensed frequencies to determine subsequent first temperatures (700).

As may be understood from the above description, inaccuracies due to assumptions regarding the value for the effective length may be eliminated or reduced to provide increased precision in determining the turbine inlet temperature, enabling improved control of the combustor 16, such as to control the fuel/air mixture to obtain a desired inlet temperature. Further, the constant value, k, may be recalibrated with reference to the exhaust temperature at different times during operation of the engine to verify that the value of the constant, k, is correct.

In accordance with a further aspect of the invention, the method may further include identifying at least two acoustic frequencies at the first location in the engine, each acoustic frequency being associated with a different frequency mode, n. That is, time series signals may be obtained from the acoustic sensors 26, and the time series signals may be analyzed in the frequency domain to determine dominant frequencies, the dominant frequencies corresponding to different frequency modes. For each frequency mode, the temperature value determined by the function, T, may be described by the equation:

$$T = f_n^2 \times k_n$$

where:
$f_n$ is the identified acoustic frequency for the $n^{th}$ frequency mode;
$k_n$ is the calculated constant value for the $n^{th}$ frequency mode;
wherein it may be understood that the value of T is the same for each mode, n.

Referring to FIG. 4, exemplary plots of frequency versus temperature are illustrated for different modes. It may be seen that the plots for the different modes are spaced apart along the frequency axis, and each frequency, $f_n$, with its corresponding temperature, T, may be tracked substantially continuously using the respective constant value, $k_n$. Preferably, the temperature, T, within the passage 17 is monitored using plural modes, n, of frequency such that, if one mode disappears or is not detected for any period of time, the remaining frequency modes may be used to determine the temperature.

Figure 6:
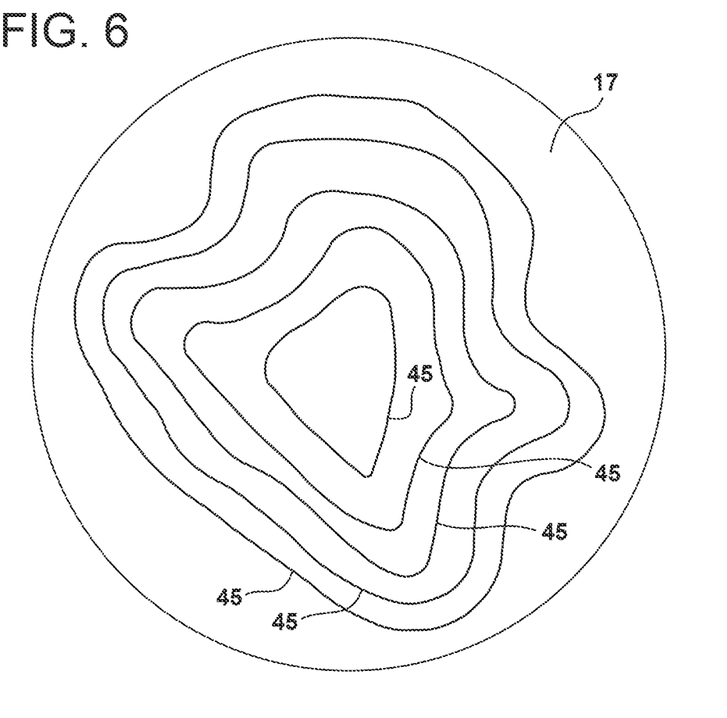
FIG. 6 is a diagrammatic illustration of a two-dimensional temperature plot.

In accordance with another aspect of the invention, the turbine inlet sensor unit 25 includes two or more of the acoustic sensors 26 in order to provide a two-dimensional map of the temperature extending across a plane within the passage 17 and perpendicular to flow through the passage 17, such as is illustrated by FIG. 6 depicting exemplary isotherms 45 at the plane of the acoustic sensors 26. In a preferred embodiment, multiple acoustic sensors 26 are distributed around the circumference of the passage 17, as is illustrated in FIG. 2. Each sensed combustion event 36 within the passage 17 may be sensed by a plurality of the acoustic sensors 26, located at different distances from the combustion event 36, wherein known techniques may be used to determine the locations of the combustion events 36, and the sensed frequencies may be used to determine the temperatures at the identified locations. For example, known tomography mathematical modeling techniques using travel times of the acoustic frequencies in the passage 17 may be utilized to provide a 2-D map of temperatures across the passage 17, as is depicted diagrammatically in FIG. 6.

Further, it should be understood that additional sensors 26 may be located at a different or additional plane within the passage 17, where the temperature may be sensed and plotted to provide a temperature map at the additional plane.

Figure 7:
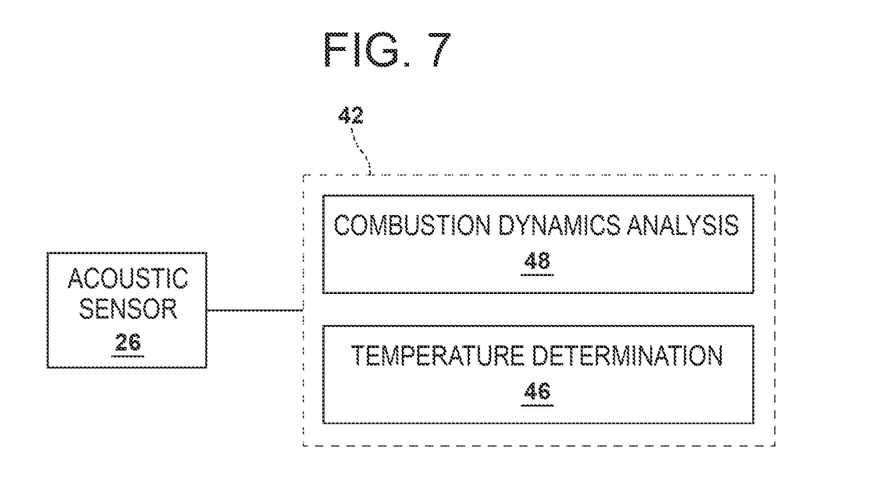
FIG. 7 illustrates a data acquisition and processing unit providing two channels for processing acoustic signals from the acoustic sensors.

As is diagrammatically illustrated in FIG. 7, the acoustic frequency signals provided from the sensors 26 to the controller may be utilized in two channels, such as first and second channels 46, 48 within the data acquisition and processing unit 42. In particular, the first channel 46 within the unit 42 may comprise a temperature processing channel for determining temperatures within the combustors 16 as described above, and the second channel 48 may comprise a combustion dynamics processing channel. The combustion dynamics processing channel 48 may utilize the frequency signals, separately from the first channel 46, in a conventional manner for monitoring vibration related conditions within the engine 10, including identifying vibration modes occurring within the combustors 16 that may be harmful, such as vibrations corresponding to natural frequencies of the combustors 16.

The described system and method provides improved control over turbine operation in that a direct measurement of the turbine inlet temperature is obtained for use in determining operating conditions of the engine. In particular, the direct temperature measurement of the present system and method avoids inaccuracies that could be introduced though calculation assumptions of prior methods. Further, when used in a can-annular combustor, the present method and system can provide individual bulk temperature measurements associated with each or the combustors, as well as two-dimension temperature maps that can contribute to providing improved combustion control and an in-situ tuning method. The improved combustion control permits engine optimization including facilitating operating the engine at its design temperature operating point, potentially providing a reduction in engine emissions.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of determining a temperature of a working gas passing through a passage to a turbine section of a gas turbine engine, comprising:
   identifying, by an acoustic sensor, one or more acoustic frequencies at a first location in the engine upstream from the turbine section, the one or more acoustic frequencies being generated within the working gas;
   determining by a computer processor, for each of the one or more acoustic frequencies, a first temperature value of the working gas at the first location based on a function, T, that is directly proportional to a function of each of the one or more acoustic frequencies and a calculated constant value corresponding to each of the one or more acoustic frequencies;
   determining, by a temperature sensor, a second temperature of the working gas at a second location downstream from the turbine section in the engine;
   based on the second temperature, determining by the computer processor a calculated temperature value for the working gas at the first location;
   comparing, by the computer processor, the first temperature value determined for each of the one or more frequencies to the calculated temperature value and, for each of the one or more frequencies, changing the calculated constant values to recalculated constant values based on the comparison;
   determining, by the computer processor, subsequent first temperature values at the first location based on further identified acoustic frequencies and the recalculated constant values; and
   controlling a combustion operation of the gas turbine engine using at least one of the first temperature, the second temperature, and the calculated temperature value,
   wherein the function, T, that is directly proportional to the function of each of the one or more acoustic frequencies the acoustic frequency and the calculated constant value is described by the equation:

$$T = f^2 \times k$$

where:
f is the identified acoustic frequency; and
k is the calculated constant value,
   wherein the calculated constant value, k, is described by the equation:

$$k = 16L^2/\gamma R$$

where:
L is an effective length corresponding to dimensional characteristics of the passage;
$\gamma$ is a ratio of specific heats; and
R is the gas constant
wherein the recalculated constant value for each of the one or more acoustic frequencies corresponds to a value for the effective length, L, that is adjusted such that the first temperature value determined for the first location is equal to the calculated temperature value.

2. The method of claim 1, wherein identifying the one or more identified acoustic frequencies includes determining one or more dominant frequencies at the first location.

3. The method of claim 1, wherein the one or more acoustic frequencies are generated by combustion of a fuel/air mixture at the first location.

4. The method of claim 1, wherein a plurality of temperature values are determined at the first location, and determining a two-dimensional temperature map for at the first location based on the plurality of temperature values.

5. The method of claim 4, including determining a bulk temperature at the first location based on a mean temperature obtained from the two-dimensional temperature map.

6. The method of claim 1, wherein the first location is at a combustor for the engine and the second location is selected to obtain a turbine exhaust temperature.

7. The method of claim 6, wherein the first location is selected to obtain a turbine inlet temperature.

8. The method of claim 1, including identifying at least two acoustic frequencies at the first location in the engine, each acoustic frequency being associated with a different frequency mode, n, and, for each frequency mode, the first temperature value determined by the function, T, is described by the equation:

$$T = f_n^2 \times k_n$$

where:
$f_n$ is the identified acoustic frequency for the nth frequency mode;

$k_n$ is the calculated constant value for the nth frequency mode; and wherein the value of T is the same for each mode, n.

9. The method of claim 8, wherein the acoustic frequencies are sensed at two or more positions around a periphery of the passage to the turbine section, further including:

determining two or more temperature values at each of two or more different locations located generally within a planar region defined as extending radially within the passage;

wherein each temperature is determined by sensing two or more frequencies, each frequency corresponding to a respective each frequency mode at each of the two or more positions; and for each location in the planar region, determining a constant corresponding to each of the frequency modes.

10. The method of claim 1, wherein the one or more acoustic frequencies are detected by a sensor located on a duct of the engine at the first location.

11. The method of claim 1, wherein the second temperature is detected by a temperature sensor located on the engine at the second location.

12. The method of claim 1, wherein the one or more acoustic frequencies are axial resonant frequencies.

13. A system for determining a temperature of a working gas passing through a duct defining passage to a turbine section of a gas turbine engine, the system comprising:

at least one acoustic sensor on the duct located at a first axial location in the engine upstream from the turbine section, the at least one sensor sensing acoustic frequencies, and producing frequency signals corresponding to one or more acoustic frequencies generated within the working gas;

a processor for determining, for each of the one or more acoustic frequencies, a first temperature value of the working gas at the first location based on a function, T, that is directly proportional to a function of each of the one or more acoustic frequencies and a calculated constant value corresponding to each of the one or more acoustic frequencies;

a temperature sensor located at a second location in the engine downstream from the turbine section, the temperature sensor providing a temperature signal to the processor corresponding to a second temperature of the working gas at the second location in the engine;

the processor operating to:

determine a calculated temperature value for the working gas at the first location based on the second temperature;

compare the first temperature value determined for each of the one or more frequencies to the calculated temperature value and, for each of the one or more frequencies, change the calculated constant values to recalculated constant values based on the comparison; and determine subsequent first temperature values at the first location based on the recalculated constant values and further identified acoustic frequencies sensed by the acoustic sensor; and control a combustion operation of the gas turbine engine using at least one of the first temperature, the second temperature, and the calculated temperature value, wherein the processor determines the value for the function, T, using the equation:

$$T = f^2 \times k$$

where:

f is the identified acoustic frequency; and k is the calculated constant value, wherein the processor determines the calculated constant value, k, using the equation:

$$k = 16L^2/\gamma R$$

where:

L is an effective length corresponding to dimensional characteristics of the passage;

γ is a ratio of specific heats; and

R is the gas constant;

wherein the recalculated constant value for each of the one or more acoustic frequencies corresponds to a value for the effective length, L, that is adjusted such that the first temperature value determined for the first location is equal to the calculated temperature value.

14. The system of claim 13, wherein the first location is at a duct associated with a combustor for the engine and the second location is located downstream from the turbine section to obtain a turbine exhaust temperature.

15. The system of claim 14, including a plurality of the acoustic sensors spaced around a periphery of the duct, each of the acoustic sensors providing frequency signals to the processor.

16. The system of claim 15, wherein the processor determines a two-dimensional temperature map for at the first location based on the processor determining temperature values at each of two or more different locations located generally within a planar region defined as extending radially within the passage.

* * * * *